Oct. 8, 1935.  A. J. GIEBEL  2,016,546
REFLECTOR DEVICE
Filed March 29, 1933
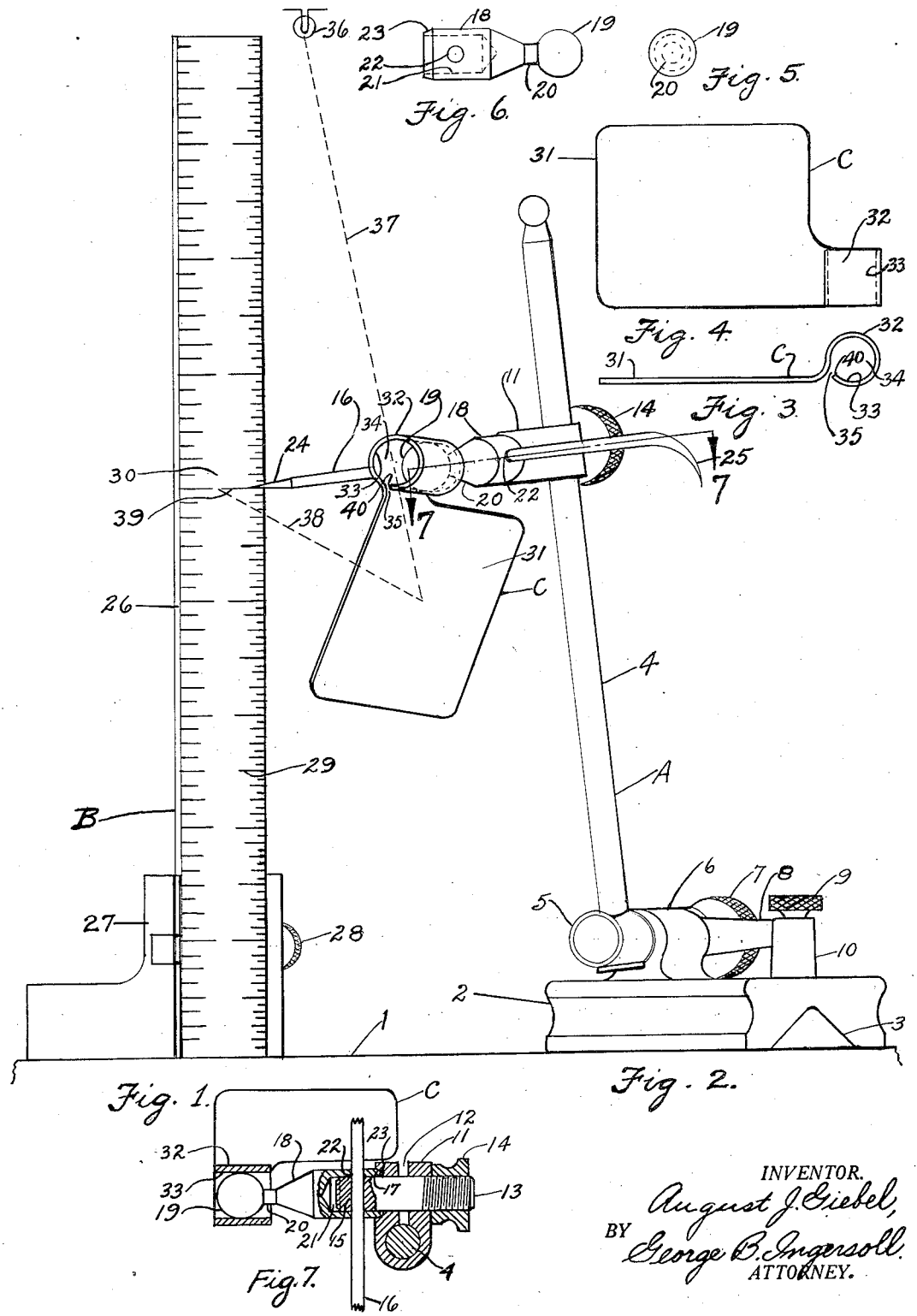
INVENTOR.
August J. Giebel,
BY George B. Ingersoll.
ATTORNEY.

Patented Oct. 8, 1935

2,016,546

UNITED STATES PATENT OFFICE 2,016,546

REFLECTOR DEVICE

August J. Giebel, Detroit, Mich.

Application March 29, 1933, Serial No. 663,263

8 Claims. (Cl. 33—169)

My invention relates to improvements in light reflector devices for illuminating graduated lines on measuring devices and on portions of machines which are graduated to facilitate the control or setting of the machines; and the objects of my improvements are, first, to provide a light reflector device that can be readily adjusted to operate at any desired angle without substantial distortion; second, to provide a light reflector device mounted on a spherical member to provide a universal movement therefor; third, to provide a light reflector device with a resilient portion adapted to frictionally grip a supporting member; fourth, to provide a light reflector device that can be readily installed on a conventional measuring or measurement transferring device; fifth, to provide a light reflector device that will move with an adjustably mounted measuring or transcribing device; sixth, to provide a light reflector device and a scriber member mounted on a common support member; and, seventh, to provide a light reflector device which is simple in construction and operation.

I attain these objects by mechanism illustrated in the accompanying drawing, in which—

Figure 1 is a view of a graduated scale mounted in a holder for same; Figure 2, a view of a surface gauge with the light reflector device mounted thereon and with the scriber of the surface gauge indicating a measurement line on the graduated scale in Figure 1; Figure 3, a detail side view of the reflector; Figure 4, a detail plan view of the reflector; Figure 5, a detail end view of the ball member for supporting the reflector; Figure 6, a detail side view of the ball member for supporting the reflector; and Figure 7, a sectional view taken on the line 7—7 of Figure 2.

Similar numerals refer to similar parts throughout the several views.

The light reflector device is disclosed in the accompanying drawing as being mounted and used in conjunction with a conventional surface gauge assembly "A", which is disclosed as being mounted on a surface plate indicated at 1. The surface gauge assembly "A", is provided with the member or base 2 for contacting the upper surface of the plate 1, the member 2 being provided with a triangular slot 3 to facilitate the contact of the member 2 on the surface plate 1.

The spindle 4 is suitably mounted in the nut member 5 and is suitably clamped in the boss 6 by means of the knurled nut 7. The spindle 4 may be oscillated about the center of the boss 6 and after its adjusted position is selected, the spindle 4 may be locked in its adjusted position by the knurled nut 7. In order to provide for fine adjustment of the spindle 4, the spindle 4 may be operatively connected with the arm 8, which in turn may be suitably adjusted for the desired position of the spindle 4 by means of the knurled member 9, the end of the lever 8 being suitably supported adjacent the portion 10.

The clamping member 11 may be slidably moved up and down the spindle 4 and is provided with a slot 12, which enables the clamping member 11 to be clamped around the spindle 4 by the screw 13 and the knurled member 14. The screw 13 is provided with a hole 15 in which is slidably mounted the scriber or pointer 16.

The clamping member 11 is provided with a countersunk surface 17 as disclosed in the sectional view, Figure 7.

To install my light reflector device upon the conventional surface gauge assembly "A", the conventional scriber holder sleeve of the surface gauge assembly "A", is removed and replaced by the sleeve member 18. The sleeve member 18 differs principally from the conventional sleeve member of a surface gauge assembly, by the addition of the spherical or ball end 19 and the undercut or neck portion 20 which connects the ball end 19 with the body of the sleeve member 18. The sleeve member 18 is provided with the hole 21 which fits over the end of the screw 13. The sleeve member 18 is further provided with the hole 22 through which extends the scriber 16, the scriber 16 thus extending through both of the holes 15 and 22, located respectively in the screw 13, and the sleeve member 18.

The sleeve member 18 is further provided with the frustro-cylindrical or conical surface 23 at its end, the conical surface 23 being adapted to engage the countersunk surface 17 of the clamping member 11.

As the knurled member 14 is operated on the screw 13 to its clamping position, the screw 13 will tend to move the scriber 16 inwardly towards the spindle 4, and this in turn will tend to cause the scriber 16 to crowd the sleeve member 18 against the countersunk portion 17 of the clamping member 11. The friction thus developed between the countersunk portion 17 of the clamping member 11, and the conical surface 23 of the sleeve member 18, will lock the sleeve member 18 and the screw 13 together with the scriber 16, in any desired position.

It will be thus noted that the scriber 16 can be readily adjusted through the sleeve member 18 and the screw 13 to any desired position. Also due to the ability of the screw 13 and the sleeve 18 to be oscillated about the axis of the screw 13, the scriber can thus be adjusted to any desired scribing position.

The scriber 16 may be provided at one of its ends with a straight pointed end 24 and the scriber 16 may be further provided at its other end with a curved pointed end 25 to facilitate scribing operations.

The scale assembly "B" as used by mechanics universally for determining the actual height of a surface, which has been located by the scriber 16 of the surface gauge assembly "A", relative to the surface of the surface plate 1, is slidably mounted on the surface as disclosed in Fig. 1, for determining the actual length of this desired dimension by means of the scriber 16. The scale 26 is suitably mounted in the base 27 and is adapted to be clamped or secured therein by the adjusting member 28, this constituting a conventional scale assembly as used in measuring devices throughout the mechanical profession. The scale 26 is provided with graduated lines 29 and in order to determine the actual height of the scribing surface, the scale 26 is located in the holder 27 with its lower end in contact with the surface 1.

In many instances the use of surface gauge assembly "A", and the scale assembly "B" in conjunction with the surface plate 1, is used by a mechanic with considerable difficulty due to lack of the proper light, either natural or from artificial lighting means which are found in a good many shops and plants, and in which the mechanic must necessarily perform his measurement and his machining operations. Also this is due to the fact that no matter how efficient the lighting means is that is employed, when the lighting means is located as is generally the case, above the surface plate 1, the tendency of the rays are to extend longitudinally and downwardly along the scale assembly "B".

With my invention, it is possible to utilize the ordinary lighting means of the room in which the mechanic is operating, so that the best light whether of artificial or of natural means, may be controlled so that the available daylight, or lamp light rays may be reflected from any angle, directly upon the surface of the scale 26 which is desired to be illuminated, thus accomplishing the illumination of that portion of the scale in which the scribed dimension is to be transferred, as disclosed in Figs. 1 and 2, to such a marked degree that greater accuracy in the measurement is obtained and at the same time, the necessary eyestrain, incidental to such fine measuring operations, is eliminated. The illuminated portion of the scale 26 is indicated at 30, adjacent both sides of the pointed end 24 of the scriber 16.

In order to accomplish this reflection of the light as above described, the reflector "C" comprises the reflector body 31, which is made preferably of metal, with reflecting surfaces on either one or both of its main surfaces and is so constructed that a portion of the reflector is formed into the cylindrical loop portion 32, which is provided with the surface 33 for engaging the ball end 19.

It is to be noted that the hole 34 through the cylindrical loop portion 32 is of slightly lesser area or diameter than the outside diameter of the ball end 19, which tends to slightly distort or increase the area of the portion 34 as the cylindrical loop portion 32 is provided with a small gap or space 35, between its unattached end 40 and the reflector body of the reflector "C".

The cylindrical loop portion 32 thus forms a resilient and cylindrical shaped end which frictionally grips the ball end 19 and due to the spherical surface of the ball end 19, the reflector device "C" may be swivelly adjusted by universal movement in any desired position for engaging and reflecting the light rays, no matter where the lighting means may be located in the room.

A conventional electric light unit is indicated at 36 and the dotted line 37 indicates the manner in which the rays from the light 36 strike the reflector device "C", and the dotted line 38 indicates the method in which the light rays are again reflected to and adjacent the line 39, which is being scribed as indicated by the scriber 16.

It is to be noted that with my light reflecting device "C", as installed on a measuring instrument or used in conjunction with other measuring devices, the surface gauge assembly "A" may be moved to the work to be measured to check or lay lines, and after such an operation the reflector device "C" can be used to illuminate the work desired to be measured. The reflector device "C" may be adjusted so as not to interfere with the work, and without disturbing the scriber setting.

It is also to be noted that when the gauge or device is to be packed or stowed away that the reflector device assembly C can be readily removed by pulling the same from the ball end 19.

It is to be understood that whereas the form of the embodiment or installation of my invention as herein disclosed may constitute a preferred form, that other adaptations of my invention may be used and may be applied to various types of measuring devices, and utilized in a great number of measuring operations.

Also my invention can be further adapted not only for the illumination of graduated scales but also for illuminating a plurality of graduations when such graduations are incorporated upon the control portions of various machines to accomplish accurate mechanical operations.

Also my reflector device invention may be further adapted for the illumination of gauges and dials and may also be used directly in the mechanical operations of machining work in various commercial fields, and also gauges and dials used in pyrometer, heat treating and metallurgical devices.

It is to be especially noted that the use of my method of supporting the light reflector assembly "C", allows the scriber 16 to be lowered, elevated, and adjusted in the regular and conventional manner to any desired position.

The reflector device assembly "C" may be constructed of any suitable material having reflecting qualities and I have found that polished chromium plated steel provides efficient reflector qualities and provides economical manufacture.

The cylindrical loop portion 32 may be located at one side or corner of the reflector body 31 to permit the reflector surface to be located under and closer to the scriber 16.

I claim:

1. The combination of a member for reflecting light rays from a source of light to a unit provided with a plurality of graduations, said member being provided with a cylindrical loop portion, and means for supporting said member, said means being provided with a spherical member engaging the cylindrical loop portion of said first mentioned member, said means and said loop member constituting a single joint to permit said first mentioned member to move swively and transversely relative to the center of said spherical member.

2. The combination of a member for reflecting light rays from a source of light to a unit provided with a plurality of graduations, said member being provided with a cylindrical loop portion having a resilient wall portion, and means for supporting said member, said means being provided with a spherical portion engaging the inside surface of the cylndrical loop portion of said member, said spherical portion having a normal diameter larger than the diameter of the opening in the loop portion of said member, said spherical portion being gripped by said cylindrical portion to provide the sole means for maintaining said first mentioned member on said spherical portion.

3. The combination of a rectangular shaped member for reflecting light rays from a source of light to a unit provided with a plurality of graduations, said member being provided with a cylindrical loop portion at one of its corners, one of the ends of said cylindrical loop portion being located in the same plane as one of the sides of the rectangular member for reflecting light, and means for supporting said member, said means being provided with a spherical portion extending within the cylindrical loop portion of said member, said spherical portion of said means being resiliently gripped by said cylindrical loop portion of said member.

4. In a measuring device, the combination of a spindle, a member adapted to clamp said spindle, means for clamping said member on said spindle, said means comprising a sleeve member moved into engagement with said member by said means, said sleeve member being provided with a necked portion terminating in a spherical member, said means further comprising a member extending transversely through said sleeve member, and a light reflecting member mounted on the spherical portion of said sleeve member of said means, said light reflecting member being provided with a portion having a hole therein for engaging said spherical portion of said sleeve member, said hole being sufficiently smaller in size than said spherical portion to cause said portion of said light reflecting member to clamp said spherical portion of said sleeve member, the clamping action of said portion of said light reflecting member constituting the sole means for maintaining said light reflecting member on said spherical portion of said sleeve member.

5. The combination of a member for reflecting light rays from a source of light to a unit provided with a plurality of graduations, said member being provided with a cylindrical portion having its axis extending parallel with the reflecting surface of said member, and means for supporting said member, said means being provided with a spherical member to permit said first mentioned member to be adjustably moved to a plurality of reflecting positions, said spherical member swively and slidably engaging said cylindrical portion.

6. The combination of a reflector member having a portion of itself extending to form a loop portion having an unattached end located adjacent the main reflector portion of said reflector member, said loop portion being formed to provide a cylindrical hole therethrough, and supporting means for said reflector member, said supporting means being provided with a suitably mounted member having a spherical portion extending within and engaging the cylindrical hole formed by the loop portion of said reflector member, said spherical portion and said loop portion with its cylindrical hole constituting the sole means for adjusting said reflector member swively about the center of said spherical portion and longitudinally along the axis of said member having said spherical portion.

7. In a measuring device, the combination of a spindle member, a clamp member on said spindle member, screw means for clamping said clamp member, said screw means being provided with a spherical portion, and a light reflecting member having a bore swively engaging said spherical portion of said screw means, the annular surface of said bore of said light reflecting member further slidably engaging said spherical portion to permit said light reflecting member to be moved to or from said spindle member in a direction parallel with the axis of said bore of said light reflecting member.

8. The combination of a member for reflecting light rays, a second member supporting said first mentioned member, and means connecting said first and said second mentioned members, said means having a spherical portion connected with one of said members and extending within and engaging a bore in the other of said members, said means thereby permitting movement of said member having said bore, swively about said spherical portion and in a direction extending longitudinally of said bore.

AUGUST J. GIEBEL.